Feb. 14, 1939. H. W. HELMS ET AL 2,146,955
TRAILER SUPPORT OPERATING MEANS
Filed Sept. 10, 1936 2 Sheets-Sheet 1
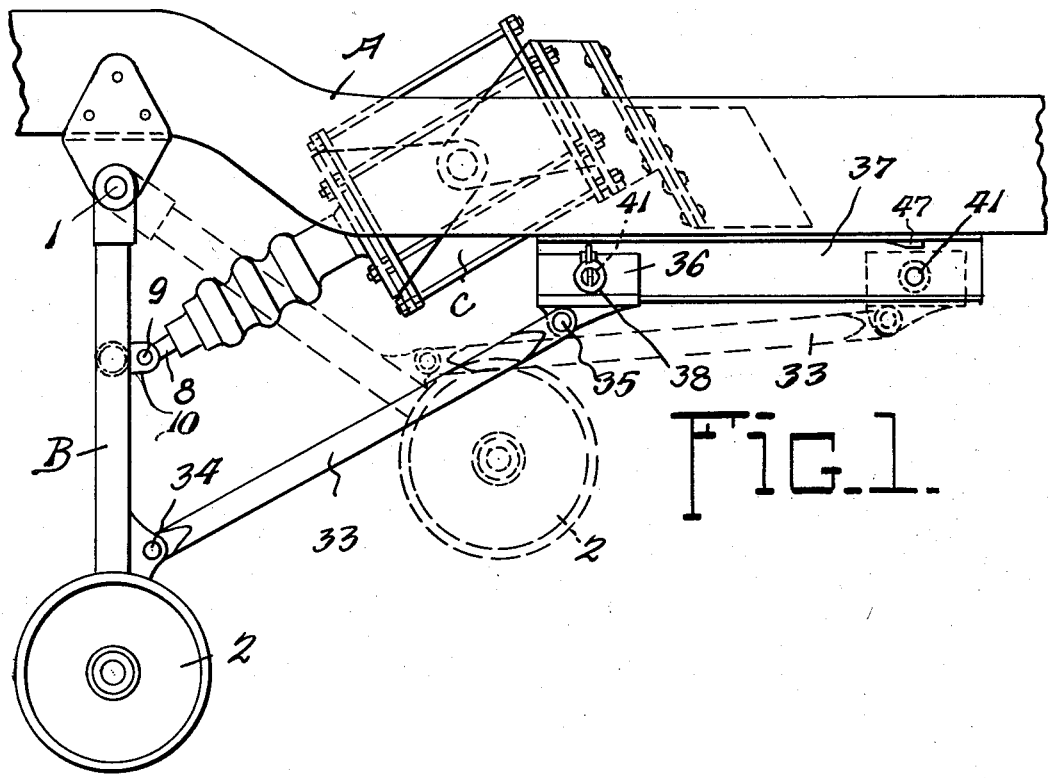
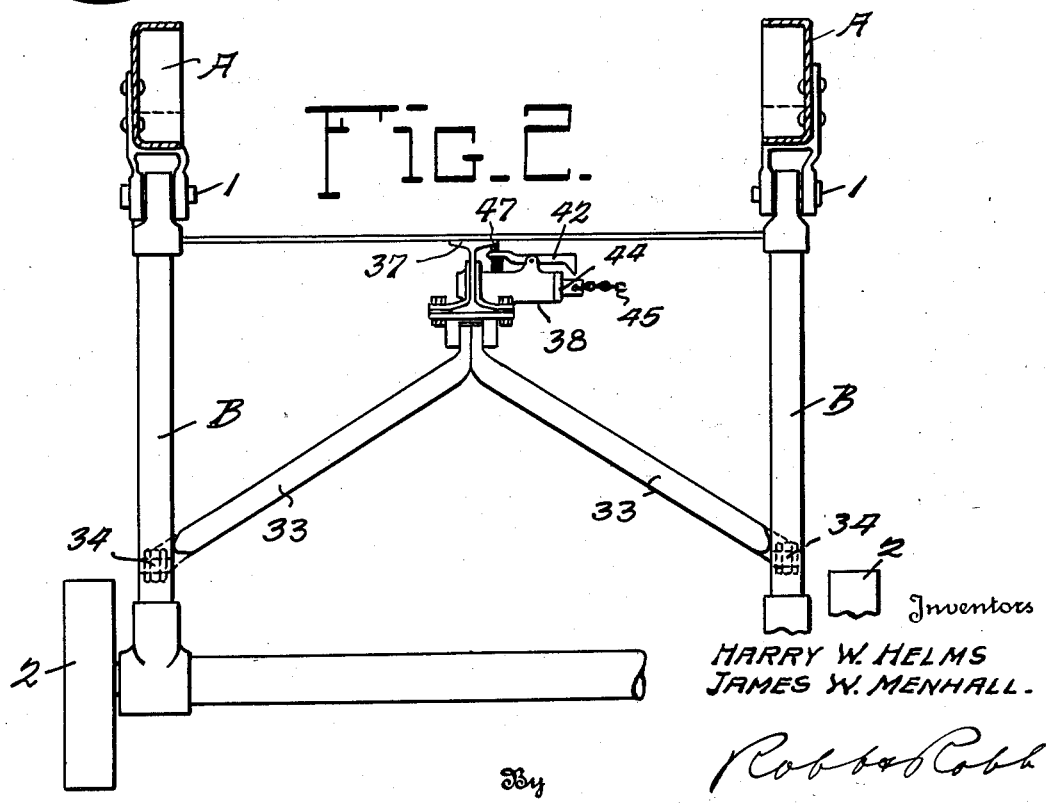
Inventors
HARRY W. HELMS
JAMES W. MENHALL
By Robb & Cobb
Attorneys

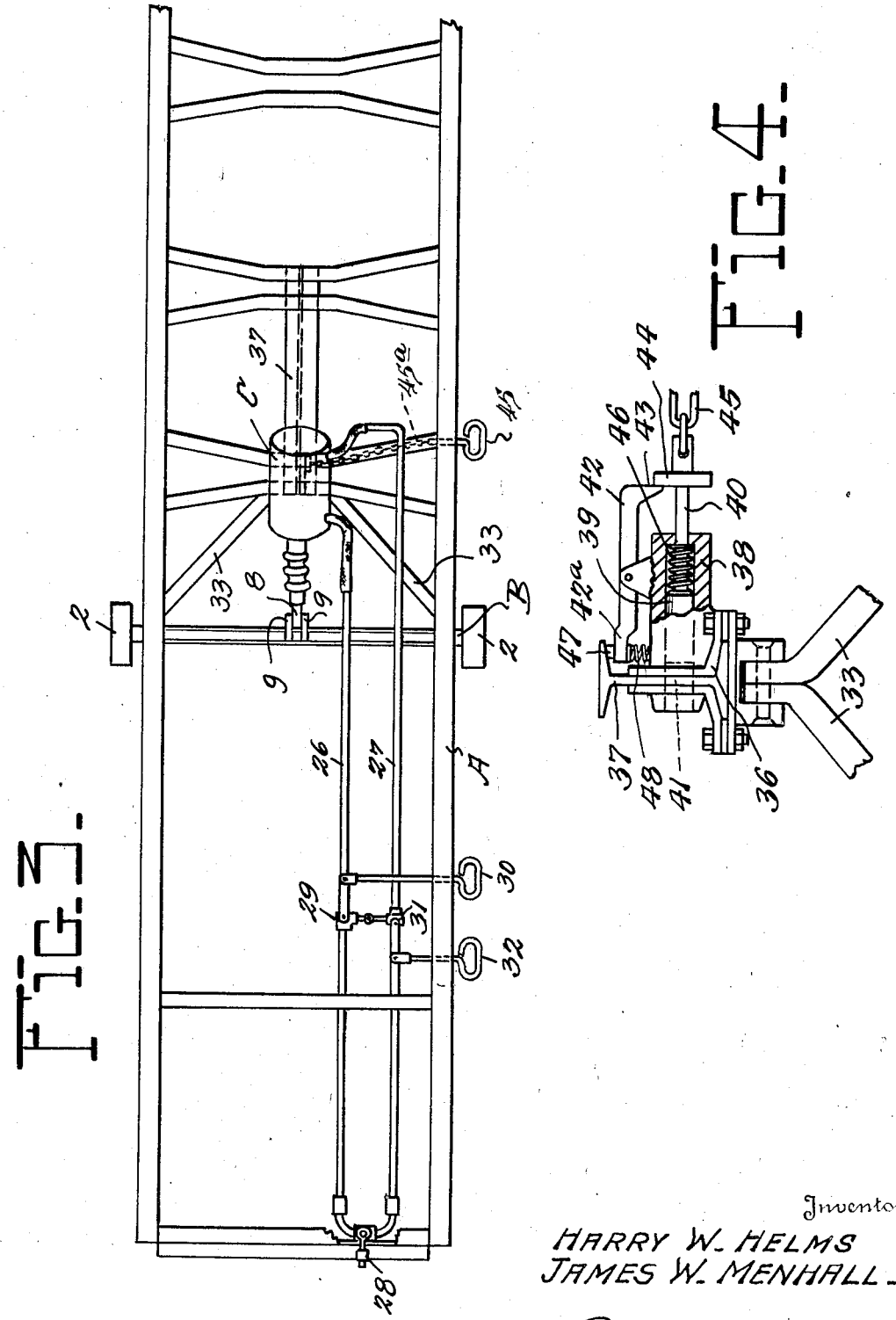

Patented Feb. 14, 1939

2,146,955

UNITED STATES PATENT OFFICE 2,146,955

TRAILER SUPPORT OPERATING MEANS

Harry W. Helms, Detroit, Mich., and James W. Menhall, Edgerton, Wis.

Application September 10, 1936, Serial No. 100,198

7 Claims. (Cl. 254—86)

Our invention appertains to the art of tractor-trailer combination vehicles and has to do primarily with the improved means for operating wheeled supports that are provided usually at the front end of the trailer vehicle for temporarily supporting the same when it is detached from the tractor vehicle. The said support ordinarily is adjustable to the extent that it may be raised out of the way when the trailer vehicle is connected to travel with the tractor vehicle, and likewise, adapted to be lowered into an operative supporting position just before the tractor pulls away from the trailer in the detaching operation.

In this particular art, there are types of trailers having wheeled supports for their front ends wherein the support is actuated by manual operating means for raising and lowering said support. In the type of trailer which we call a full automatic construction, the support for the trailer's front end is operated incident to the power movement of the tractor which causes a lowering of the support as the tractor pulls away and causes a raising of the support as the tractor is backed into connection with the trailer.

Our present improvements include some of the advantages of both of the above types of construction in that the front support for the trailer is adapted to be moved up and down by power means, including a fluid pressure or vacuum system which is manually controlled, however. Thus, our present invention may be characterized as comprising manual and power operating instrumentalities for the support at the front end of the trailer to raise and lower the latter.

In the accompanying drawings:—

Figure 1 is a fragmentary side view of a portion of a trailer illustrating the present invention.

Figure 2 is a vertical sectional view of the construction in Figure 1.

Figure 3 is a top plan view of the chassis of a trailer, showing the construction of the front support actuating and locking mechanism of the present invention, certain parts being omitted.

Figure 4 is a fragmentary view partly in section bringing out more clearly certain locking and release mechanism of the construction of Figures 1 to 3.

In Figure 1 is illustrated a portion of the trailer chassis or frame at A. The wheeled support for the front end of the trailer is designated B, and is pivoted to the trailer at the point 1. Said support B is equipped with the rollers or wheels 2 at its lower end and is shiftable downwardly to a vertical operating position in which it is seen in Figure 1, and adapted to be drawn into a rearwardly and downwardly inclined position, wherein the wheels 2 are spaced some distance above the travel surface over which the trailer operates, to avoid striking obstacles.

The means illustrated in Figures 1 and 2 for raising and lowering the support B comprises the vacuum or fluid pressure cylinder C, which is preferably pivotally connected to the chassis or frame A. By utilizing the vacuum or pressure effect to a fluid medium introduced into the cylinder C, the piston member therein, not shown, may be shifted to impart to the piston rod 8 thereof downward and upward movement. The rod 8 is connected pivotally at 9 to a swinging pivot member 10 attached to the support B. The vacuum or pressure effects in the cylinder C will be manually controlled and will cause operation of the piston rod 8 to shift the support B downwards to an operative position in which it is shown in Figures 1 and 2, or raise it by rearward movement to its inoperative position in which the wheels 2 are elevated from the ground surfaces.

Fluid lines 26 and 27 lead to the front and rear ends respectively of the cylinder C. At their front ends, the lines 26 and 27 are connected by a union which in turn is equipped with a coupling 28 that may be coupled to a hose line or conduit leading to a suitable source of fluid supply, either vacuum or pressure, the latter disposed upon the tractor vehicle. A valve 29 controlled by the handle member 30 permits the fluid medium to operate through the line 26 to act on the piston in the cylinder C at one side thereof. A valve member 31 operable by the handle 32 is adapted to cause fluid in the line 27 to act upon the piston in the cylinder C from the rear end of the cylinder in a reverse manner to the action of the fluid medium supply through the pipe line 26.

In Figure 1 the fluid motor actuating unit comprises locking means provided with the links 33 connected pivotally at 34 to the lower portion of the support B and connected at 35 to a lock slide 36 on the guide 37.

On the slide 36, as seen in Figures 2 and 4, is carried a lock pin casing 38 in which is mounted the lock pin or plunger 39 having the stem 40. The plunger 39 is adapted to engage in a front opening in the guide 37 and a rear opening in said guide, the same designated 41. When the support B, in Figure 1, is in operative position the pin 39 engages in the front opening of the guide 37 and when the support is raised to an inoperative position, the pin engages in a rear opening 41 of said guide.

We provide, according to Figures 1, 2 and 4, a latch 42, the nose 43 of which is adapted to engage a collar 44 on the stem 40, with which may be directly connected a chain or any other suitable actuating member 45 having a handle 45a by which the plunger 39 may be pulled out of engagement respecting the guide 37. Normally, the plunger 39 is pressed by a spring 46 in a direction to engage the openings 41 of the member 37. By pulling outwardly on the part 45 the plunger 39 may be disengaged from an opening 41 in the guide 37 with which it may cooperate, and it may thus be held disengaged by the nose 43 of the latch 42 as shown in Figure 4.

When so disengaged by causing fluid to act upon the piston in the cylinder C, the slide 36 may be forced rearwardly along the guide 37 as the piston rod 8 raises the support B. At a predetermined point in the movement of the slide 36, the tail 42a of the latch 42 will strike a projection 47 on the guide 37 and this will rock the tail downwards against the action of the spring 48, thereby releasing the abutment 44 from the nose 43 of the latch 42 and permitting the plunger 39 to be freed from the latch 42 so as to enter the rear opening 41 when the slide 36 reaches the dotted line position of Figure 1, and said plunger 39 is opposite said rear opening 41. The same action of release of the part 44 from the latch 42 may take place incident to forward movement of the slide 36 after same has been unlocked manually and fluid is caused to act upon the piston in the cylinder C for the lowering operation of the support B. It is not necessary for the operator to hold the plunger 39 in released position, after it is once pulled out, until the valve control means that causes the fluid medium to act upon the piston in the cylinder C, is actuated.

Figure 2 shows the plunger 39 in its locking position as distinguished from that illustrated in Figure 4.

Obviously, if desired, the member 37 may be provided with a series of holes so as to permit adjustability of the support in its lowered position for different ground conditions.

While power operated means have been shown for raising and lowering the support it will be obvious to those skilled in the art that the lowering of the support may, if desired, be performed by the gravity action of the support upon unlocking of the same in its raised position.

Having thus described our invention, what we claim as new and desire to secure by Letters Patent of the United States, is:—

1. In trailer support operating means, in combination, a trailer frame, a movable support for the front end thereof shiftable to an operative position to support said frame and its load and an inoperative position for avoiding obstacles during travel of the trailer behind a tractor vehicle, and manually controlled means for actuating the said support directly connected thereto, combined with locking means to hold the support lowered and operative, or elevated to an inoperative position, including lock devices acting automatically when the support is lowered to lock same in its operative position, and when the support is elevated to lock same in its inoperative position, manual control means for the lock devices to unlock same, and automatic means to hold the lock devices unlocked temporarily during movement of the support, said automatic means being operative upon actuation of said manual control means.

2. In trailer support operating means, in combination, a trailer frame, a movable support for the front end thereof shiftable to an operative position to support said frame and its load and to an inoperative position for avoiding obstacles during travel of the trailer behind a tractor vehicle, manually controlled means for actuating the said support, combined with locking means to hold the support lowered and operative, or elevated to an inoperative position, including lock devices acting automatically when the support is lowered to lock same in operative position, and when the support is elevated to lock same in inoperative position, manual control means for the lock devices to unlock same, means to hold the lock devices unlocked temporarily during movement of the support, and means to automatically trip the lock devices at a predetermined point in their movement to cause them to become operative to perform their locking functions.

3. In trailer support operating means, in combination, a trailer frame, a movable support for the front end thereof, shiftable to an operative position to support said frame and its load and to an inoperative position for avoiding obstacles during travel of the trailer behind a tractor vehicle, manually controlled means for actuating the said support directly connected thereto, combined with locking means to hold the support lowered and operative, or elevated to an inoperative position, including lock devices acting automatically when the support is lowered to lock same in operative position and when the support is elevated to lock same in inoperative position, a guide on the frame, a slide on the said guide to move along the same and carrying the lock devices so they can engage the guide, and connections between the slide and said support directly connecting the slide and the support.

4. In trailer support operating means, in combination, a trailer frame, a movable support for the front end thereof shiftable to an operative position to support said frame and its load and to an inoperative position for avoiding obstacles during travel of the trailer behind a tractor vehicle, manually controlled means for actuating the said support, combined with locking means to hold the support lowered and operative, or elevated to an inoperative position, including lock devices acting automatically when the support is lowered to lock same in operative position, and when the support is elevated to lock same in inoperative position, manual control means for the lock devices to unlock same, means to hold the lock devices unlocked temporarily during movement of the support, and means to automatically trip the lock devices at a predetermined point in their movement to cause them to become operative to perform their locking functions, a guide on the frame, a slide on the said guide to move along the same and carrying the lock devices so they can engage the guide, and connections between the slide and said support.

5. In trailer support operating means, in combination, a trailer frame, a movable support for the front end thereof shiftable to an operative position to support said frame and its load and to an inoperative position for avoiding obstacles during travel of the trailer behind a tractor vehicle, manually controlled means for actuating the said support, combined with locking means to hold the support lowered and operative, or elevated to an inoperative position, including lock devices acting automatically when the support is lowered to lock same in operative position, and when the support is elevated to lock same in inoperative position, manual control means for the lock devices to unlock same, means to hold the lock devices unlocked temporarily during movement of the support, and means to automatically trip the lock devices at a predetermined point in their movement to cause them to become operative to perform their locking functions, the lock devices comprising a spring actuated plunger, a slide connected to the frame, movable thereon, and carrying the plunger, latch means on the slide to hold the plunger in unlocked position, and an abutment on the frame to trip the plunger and release it for re-locking action.

6. In trailer support operating means, in combination, a trailer frame, a movable support for the front end thereof, shiftable to an operative position to support said frame and its load and to an inoperative position for avoiding obstacles during travel of the trailer behind a tractor vehicle, means for actuating said support directly connected thereto, and locking means to hold the support lowered and operative, or elevated to an inoperative position, said locking means including linkage connecting the support with the trailer frame and adapted upon raising of said supports to automatically lock same in inoperative position and upon lowering of said supports to automatically lock same in ground engaging position.

7. In trailer support operating means, in combination, a trailer frame, a movable support for the front end thereof shiftable to an operative position to support said frame and its load to an inoperative position for avoiding obstacles during travel of the trailer behind a tractor vehicle, means for actuating said support, combined with locking means to hold the support lowered and operative, or elevated to an inoperative position, including lock devices acting automatically when the support is lowered to lock same in operative position, and when the support is elevated to lock same in inoperative position, manual control means for the lock devices to unlock same, and means to hold the lock devices unlocked temporarily during movement of the support, the lock devices comprising a spring actuated plunger and a slide connected to the frame, movable thereon, and carrying the plunger.

HARRY W. HELMS.
JAMES W. MENHALL.